(12) United States Patent
Verschuren

(10) Patent No.: US 8,258,454 B2
(45) Date of Patent: Sep. 4, 2012

(54) LUMINAIRE AND A METHOD FOR CONTROLLING A LUMINAIRE

(75) Inventor: Coen Adrianus Verschuren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 317 days.

(21) Appl. No.: 12/741,059

(22) PCT Filed: Nov. 3, 2008

(86) PCT No.: PCT/IB2008/054561
§ 371 (c)(1),
(2), (4) Date: May 3, 2010

(87) PCT Pub. No.: WO2009/060371
PCT Pub. Date: May 14, 2009

(65) Prior Publication Data
US 2010/0253229 A1 Oct. 7, 2010

(30) Foreign Application Priority Data
Nov. 7, 2007 (EP) .................................. 07120130

(51) Int. Cl.
*H05B 39/02* (2006.01)
(52) U.S. Cl. ........ 250/216; 250/552; 315/152; 315/294; 362/233

(58) Field of Classification Search .................. 250/216, 250/208.2, 552; 315/149, 150, 152, 294; 362/611, 612, 233; 257/40
See application file for complete search history.

(56) References Cited

U.S. PATENT DOCUMENTS

| | | | |
|---|---|---|---|
| 6,548,967 B1 | 4/2003 | Dowling et al. | |
| 6,565,231 B1 | 5/2003 | Cok | |
| 2006/0028156 A1* | 2/2006 | Jungwirth | 315/312 |
| 2006/0244387 A1 | 11/2006 | Park et al. | |

FOREIGN PATENT DOCUMENTS

| | | |
|---|---|---|
| EP | 1367677 A2 | 12/2003 |
| WO | 03054980 A2 | 7/2003 |
| WO | 2005006459 A2 | 1/2005 |
| WO | 2007089581 A2 | 8/2007 |
| WO | 2008065607 A2 | 6/2008 |

* cited by examiner

*Primary Examiner* — Kevin Pyo
(74) *Attorney, Agent, or Firm* — Mark L. Beloborodov

(57) ABSTRACT

This invention relates to a luminaire comprising an OLED device, where a light detecting function of the OLED device is employed for transmitting light setting commands to the luminaire from a remote position by means of a control light signal, which carries command information. The control light signal has a header portion, which can be recognized by the luminaire and makes it ready to receive a command, and a following control command portion.

13 Claims, 4 Drawing Sheets

US 8,258,454 B2

LUMINAIRE AND A METHOD FOR CONTROLLING A LUMINAIRE

FIELD OF THE INVENTION

The present invention relates to lighting systems, and more particularly to a luminaire including an OLED device, i.e. an Organic Light Emitting Diode device, that is remotely controllable by means of light illumination of the luminaire, and a method for controlling a luminaire.

BACKGROUND OF THE INVENTION

It is recognized that, in addition to its light emitting mode, a LED can be set to a light sensing mode where it senses incident light and responds by generating a current. This function has been employed in lighting applications for remotely controlling a luminaire to switch on/off. Primarily, all that it takes is to periodically set the LED in the light sensing mode during a short interval, and to perform a threshold detection of the current generated by the LED during that interval. By illuminating the LED a current above the threshold will be detected and the LED will be switched on if it is off. By illuminating the LED a second time it will be switched off, etc.

For convenient user interaction offering more complex possibilities of for example dimming, colour tunability, etc., a simple on/off switching is not enough. Existing solutions use for example an RF-based remote control with a receiver structure integrated in the luminaire, together with a driver with enhanced functionality. A recent example is a "LivingColors LED lamp", by Philips.

However, since OLEDs for lighting applications can be manufactured to have extreme properties, such as a particularly small thickness, or transparency, a number of new and unique applications are reachable, which would make the above-mentioned receiver structure inconvenient or even prevent some applications.

SUMMARY OF THE INVENTION

It is an object of the present invention to provide a luminaire and a method of controlling a luminaire that alleviate the above-mentioned drawbacks of the prior art and provides for complex remote control of the luminaire.

This object is achieved by a luminaire according to the present invention as defined in claim 1 as well as a method according to the present invention as defined in claim 7.

The invention is based on an insight that it is possible to generate and detect by means of the OLED, a light control signal carrying one of several different control commands.

Thus, in accordance with an aspect of the present invention, there is provided a luminaire comprising an OLED, a light setting device connected with the OLED, and a mode switching unit connected with the OLED. The OLED has a light emitting mode and a light sensing mode, wherein the light setting device comprises a control command retriever and an OLED controller. The luminaire is arranged to sense a remotely emitted control light signal by means of the OLED in said light sensing mode, wherein the control light signal comprises a header portion and a control command portion following said header portion. The control command retriever is arranged to recognize the header portion and retrieve the control command, and the OLED controller is arranged to control the OLED in accordance with said control command.

Thus, by providing the control light signal it is possible to use the OLED as a single sensor, while being employed as a light emitter as well. The header identifies that important control information is to come and alerts the command retriever to retrieve that control information.

In accordance with an embodiment of the luminaire, as defined in claim 2, the control command is constituted by several bits of data, which are represented as signal levels. This enables a simple level detection as a means for determining what command has been received.

In accordance with an embodiment of the luminaire, as defined in claim 3, the header portion is employed not only for pure recognition of the light control signal but also for calibrating the control command retriever so as to ensure that the signal levels will be correctly identified.

In accordance with an embodiment of the luminaire, as defined in claim 4, the header portion is additionally employed for synchronization purposes.

In accordance with an embodiment of the luminaire, as defined in claim 5, the luminaire advantageously has a current sensor sensing the output current of the OLED in the light sensing mode.

In accordance with an embodiment of the luminaire, as defined in claim 6, the OLED repeatedly is switched between the light emitting mode and the light sensing mode, thereby facilitating the recognition of the light control signal.

In accordance with another aspect of the present invention, as defined in claim 7, there is provided a method of controlling a luminaire, which comprises an OLED, the method comprising:
alternately setting the OLED in a light emitting mode and a light sensing mode;
when the OLED is in the light sensing mode:
sensing a remotely emitted control light signal, which comprises a header portion and a control command portion following the header portion;
recognizing said header portion; and
retrieving a control command from said control command portion; and
when the OLED is in the light emitting mode:
controlling the OLED in accordance with said control command.

What has been said about the luminaire above is true also for the method and embodiments thereof.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
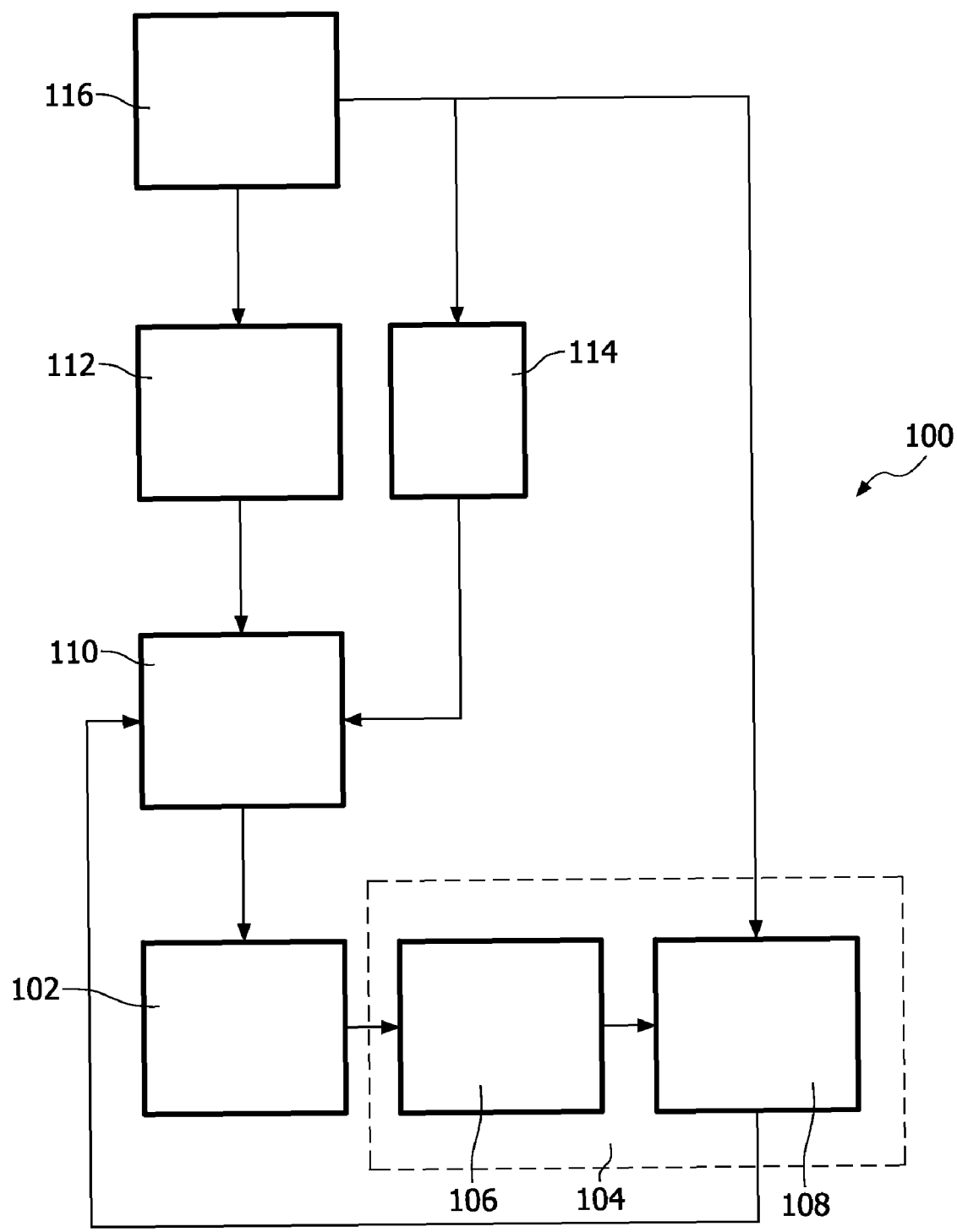
FIG. 1 is a schematic block diagram of an embodiment of the luminaire according to the present invention.
Figure 2:
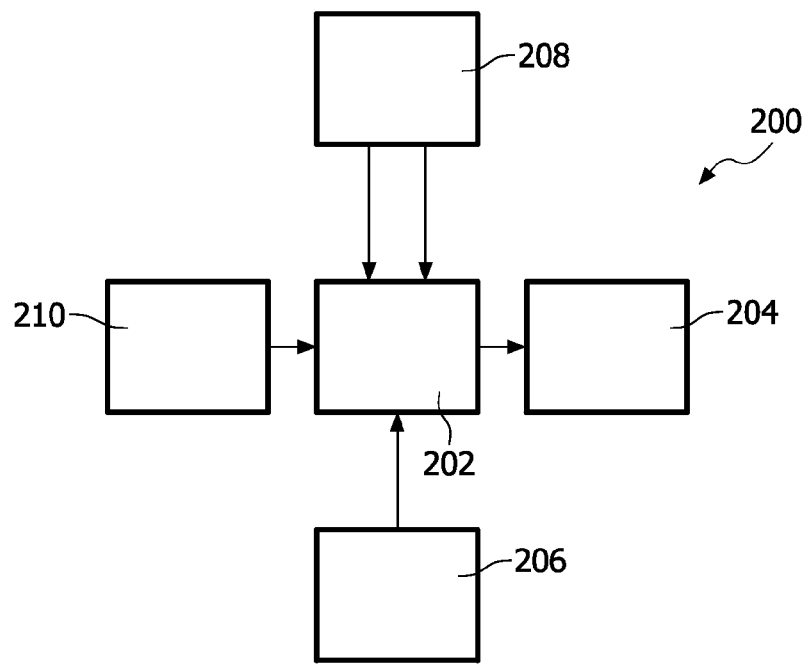
FIG. 2 is a schematic block diagram of an embodiment of a remote controller that is usable together with the luminaire.

Referring to FIGS. 1 and 2 an embodiment of the lighting system including embodiments of the luminaire 100 and the remote control device, respectively, is shown. The luminaire 100 comprises an OLED device 102, and a light setting device, which comprises a control command retriever 104, and an OLED controller 110. The OLED device comprises at least one OLED. The control command retriever 104 comprises a current sensor 106, which is connected with an output of the OLED device 102, and a command detector 108, which is connected with an output of the current sensor 106, and with an input of the OLED controller 110. The OLED controller is further connected with an input of the OLED device 102. The luminaire further comprises a mode switching circuit 112, which is connected with an input of the OLED controller 110, a reset pulse unit 114, which is connected with another input of the OLED controller 110, and a frequency generator 116, which is connected with an input of the mode switching unit 112, an input of the reset pulse unit 114, and an input of the command detector 108.

Referring to FIG. 2 an embodiment of a remote control device 200 comprises a control light signal generator 202, a transmitter unit 204, which is connected with an output of the control light signal generator 202, a user interface 206, which is connected with a first input of the control light signal generator 202, a memory 208, which is connected with a second input of the control light signal generator 202, and a frequency generator 210, which is connected with a third input of the control light signal generator 202. The transmitter unit comprises a light source, such as a laser or a Light Emitting Diode (LED) with appropriate collimating optics (such as a simple lens system) to achieve a reasonably narrow beam. For good absorption and resulting current generation in the OLED device 102, the wavelength of said light source is preferably in the short wavelength/high energy side of the visible spectrum, e.g. in the range of 400-450 nm (blue).

Figure 3:
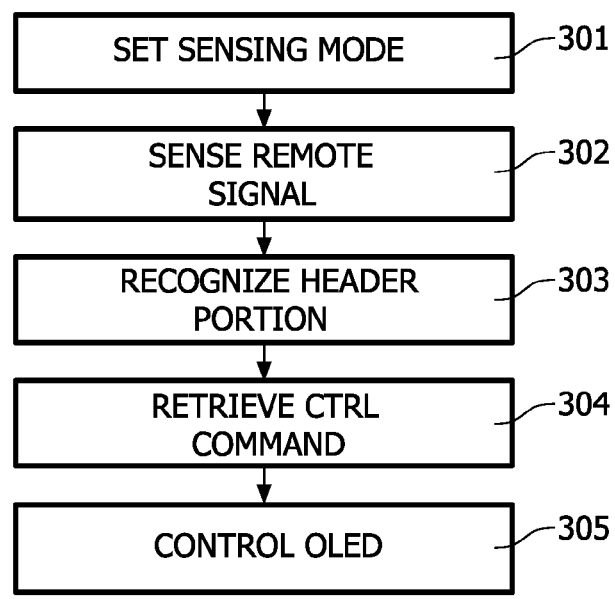
FIG. 3 is a flow chart of an embodiment of a method for controlling a luminaire according to the invention.

The luminaire 100 is operated as follows, as illustrated with the flow chart of FIG. 3. The OLED device 102 is set in one of a light emitting mode and a light sensing mode, as shown at box 301 of the flow chart, by means of the mode switching circuit 112. More particularly, in this embodiment, the OLED device 102 is continuously toggled by the OLED controller 110, in accordance with an input signal received from the mode switching unit 112, between the light emitting mode and the light sensing mode at a predetermined frequency. The frequency is in turn generated by the frequency generator 116, which feeds a frequency signal to the mode switching circuit 112.

Figure 4:
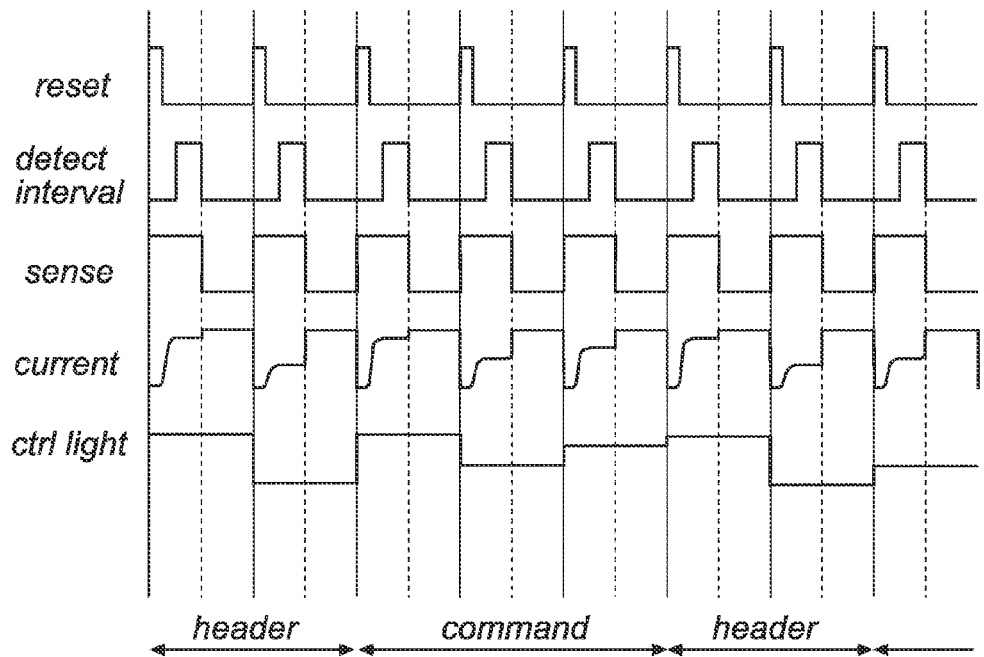
FIGS. 4-6 are timing diagrams illustrating the behaviour of signals involved in different embodiments of the lighting system according to the present invention.

In the emitting mode, the OLED device 102 emits light according to its settings as determined by driving power applied by the OLED controller 110. In the light sensing mode, the driving power is switched off and the OLED device 102 is able to sense received light and to generate a current corresponding to the received light intensity. Thus, in the sensing mode the OLED device 102 senses a remotely emitted control light signal, i.e. the control light signal generated by the remote control device 200, at box 302. The toggling mentioned above is used such that each time the OLED device 102 is in the sensing mode it detects at least a portion of the control light signal. The signal has a header portion and a control command portion, which follows the header portion, as shown in FIG. 4. This and other signals used in the present lighting system will be further described below. However as regards the control light signal, it is constituted by a plurality of consecutive bits. In this embodiment the header portion is represented by two bits and the command portion is represented by three bits. Each time that the OLED device 102 is set in the sensing mode it detects one bit thereof. Thus, it takes five periods in the sensing mode to detect the whole control light signal. Each bit is a multilevel bit, and in this particular embodiment there are four different levels. The control light signal has been generated by means of the control light signal generator 202 and transmitted, i.e. emitted, by means of the transmitter unit 204. The header portion of the received control light signal is then recognized by the control command retriever 104, at box 303. More particularly, the current sensor 106 senses the current that the received signal induces in the OLED device 102, and associates the level of the current with one of a set of different predetermined levels. Then the current sensor forwards information about the selected predetermined level to the command detector 108, which is arranged to recognize the header portion as a specific combination of two bits, i.e. two levels. Having detected the header portion, the command detector retrieves a control command from the control command portion, box 304. That is, the command detector 108 knows that the three bits following the two header bits represent the command. Depending on the combination of levels the command detector 108 associates the three bit combination with one particular command out of a set of several commands. In order to facilitate the recognition operation the frequency generator, that clocks inter alia the command detector 108 generates the same frequency as the frequency generator 210 of the remote control device 200. More details will follow below.

The command detector 108 provides information about the command to the OLED controller 110. The OLED controller 110 controls the OLED device 102 in accordance with the command, box 305. This means that when the OLED device 102 is again set in the emitting mode, the OLED controller 110 applies drive power to the OLED device 102 such that the light output of the OLED device corresponds to the intentions of the user input that was received at user interface 206 of the remote control device 200. Various commands are possible, for example increase intensity, decrease intensity, switch on or off, and select a lighting pattern among a set of predetermined lighting patterns.

When the user inputs a command to the control light signal generator 202, it fetches information about the associated bit pattern from the memory 208. Then the control light signal generator 202 generates that pattern and feeds the pattern to the transmitter unit 204.

Referring to the timing diagram of FIG. 4, in this example the frequency generator generates a 50 Hz reference frequency. The OLED device 102 is toggled between the sensing and emitting modes at that frequency, as illustrated by the "sense" signal in the diagram. The "sense" signal alternates between a high state and a low state at 50 Hz, i.e. the period of "sense" is 20 ms and the duration of each state is 10 ms. When "sense" is low the OLED device is powered by the OLED controller 110, i.e. supplied with a drive current/drive currents, and set in the emitting mode, while when "sense" is high the OLED device 102 is supplied with a substantially reduced current or a zero current, and is in the sensing mode. In order to improve the sensitivity of the OLED device 102, the reset pulse unit 114 provides a "reset" pulse to the OLED device 102 via the OLED controller 110, which reset pulse briefly shorts the OLED device 102 at the very beginning of each period when "sense" is high.

The control light signal is synchronized with the "sense" signal. During the period of "sense" one bit of the control light signal "ctrl light" is received by the OLED device 102. That is, the OLED device 102 consecutively operates in the sensing mode and the emitting mode during each bit of the control light signal. During the first half of the period of "sense", i.e. when "sense" is high, the induced current rises to a principally constant level. However, there is a rise time from the end of "reset" until the current has reached its maximum, as illustrated by "current" in the timing diagram of FIG. 4, which has to be taken into account. Therefore the actual measurement, i.e. the detection performed by the command detector 108, is performed during the latter half of the duration of the high state of "sense". This is illustrated by "detec. interval" in the timing diagram. In this embodiment there are four possible levels for the control light signal, and consequently for the induced current. This provides for 64 different commands, or codes. However, it is not predetermined when the control light signal will be sent, that is governed by user requirements. Therefore, the header portion is used for identification, or synchronization, purposes. When the command detector 108 detects a particular, and predetermined, combination of two consecutive bit levels it knows that the three bits to follow directly thereafter will represent a command. For example, an identification of the control light signal can be a first bit having the highest level followed by a second bit having the lowest level. That will exclude some combinations of command bit levels reducing the available number of different commands to 56, which is sufficient for a quite advanced functionality of the lighting system.

Additionally, or alternatively, the header bits can be used for calibration purposes. Shifting operational conditions can occur, leading to uncertainty about a detected level. When many possible current levels are used for each bit the distance between two adjacent levels is small. If the induced current is shifting the level may fall in the middle between two levels or even closer to another bit level than generated at the remote control device 200. Then, if the levels of the header bits are used to calibrate the scale of the detector levels such errors can be avoided or at least minimized.

Figure 5:
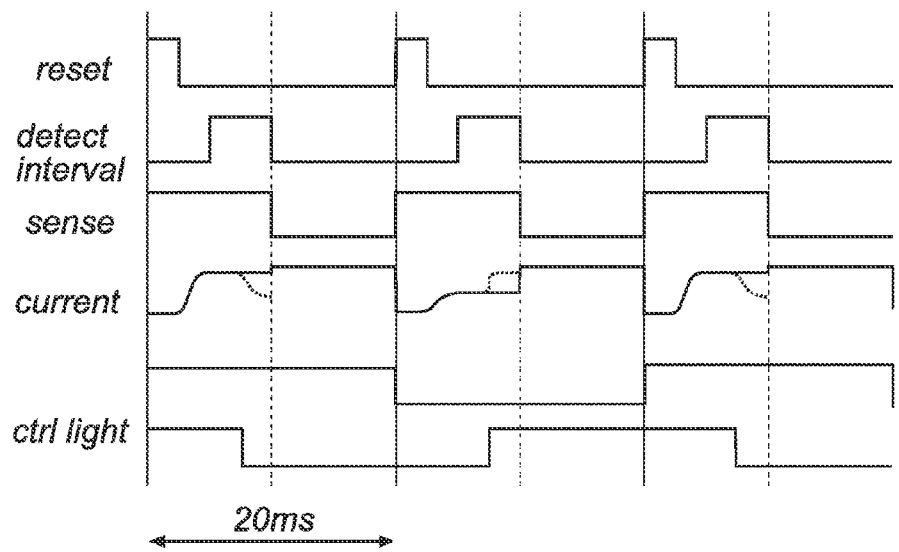
Figure 6:
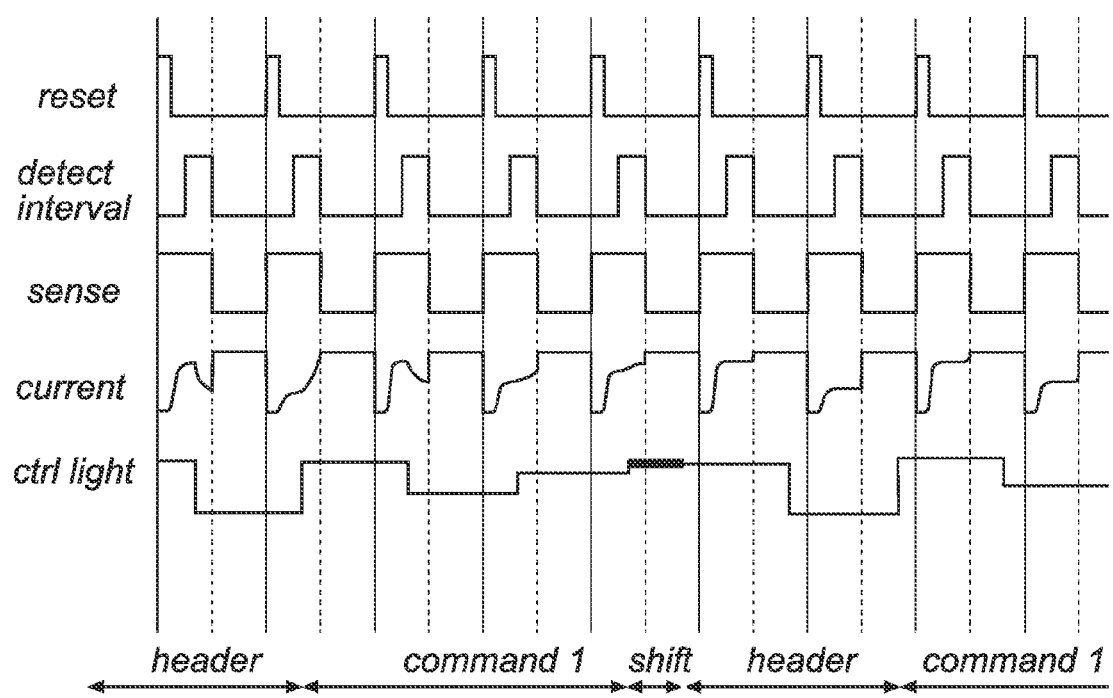

In accordance with another embodiment of the lighting system the remote control device 200 and the luminaire 100 are not frequency synchronized. Then the bits of the control light signal may reach the luminaire 100 shifted in time relative to the detection interval, as illustrated in FIG. 5. This causes erroneous level detection by the command detector 108, or the command detector 108 may even fail in detecting the header portion. This can be prevented by repeating the transmission of the control light signal shifted by an interval that is equal to the detection interval, i.e. one fourth of the period of the sense signal, as illustrated in FIG. 6. It should be noted that the shifting is illustrated by a thicker piece of line about at the middle of the control light signal in the diagram.

Above, embodiments of the luminaire and method according to the present invention as defined in the appended claims have been described. These should be seen as merely non-limiting examples. As understood by a skilled person, many modifications and alternative embodiments are possible within the scope of the invention.

For instance the frequency can be altered within an interval. A too high frequency leads to uncertainty in the detection of signal levels and problems with the light generation as well. A too low frequency will cause too slow adjustment of the light output of the OLED device, which will irritate the user.

Further the number of levels and the number of bits can be varied, etc.

Thus, as exemplified above, this invention relates to a luminaire comprising an OLED device, where a light detecting function of the OLED device is employed for transmitting light setting commands to the luminaire from a remote position by means of a control light signal, which carries command information. The control light signal has a header portion, which can be recognized by the luminaire and makes it ready to receive a command, and a following control command portion.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A luminaire comprising an OLED, a light setting device connected with the OLED, and a mode switching unit connected with the OLED, wherein the OLED has a light emitting mode and a light sensing mode, wherein said light setting device comprises a control command retriever and an OLED controller, wherein the luminaire is arranged to sense a remotely emitted control light signal by means of said OLED in said light sensing mode, said control light signal comprising a header portion and a control command portion following said header portion, wherein said control command retriever is arranged to recognize said header portion and retrieve a control command, and wherein said OLED controller is arranged to control said OLED in accordance with said control command.

2. A luminaire according to claim 1, wherein said control command is defined on basis of signal levels and is constituted by several bits of data.

3. A luminaire according to claim 2, wherein said header portion is constituted by a plurality of level calibration bits.

4. A luminaire according to claim 2, wherein said header portion is constituted by a plurality of synchronization bits.

5. A luminaire according to claim 1, wherein said control command retriever comprises a current sensor sensing an output current of the OLED in said light sensing mode.

6. A luminiaire according to claim 1, wherein said mode switching unit is arranged to toggle the OLED between said light emitting mode and said light sensing mode.

7. A method of controlling a luminaire, which comprises an OLED, the method comprising:
alternately setting the OLED in a light emitting mode and a light sensing mode;
when the OLED is in the light sensing mode:
sensing a remotely emitted control light signal, which comprises a header portion and a control command portion following the header portion;
recognizing said header portion; and
retrieving a control command from said control command portion; and
when the OLED is in the light emitting mode:
controlling the OLED in accordance with said control command.

8. A method according to claim 7, wherein said sensing a remotely emitted control light signal comprises sensing a signal level and determining that a header portion has been received upon sensing a predetermined combination of a plurality of consecutive signal levels.

9. A method according to claim 8, wherein said sensing a remotely emitted control signal comprises calibrating the retrieval of a control command by means of said plurality of consecutive signal levels.

10. A method according to claim 7, wherein said light sensing mode is lasting for a predetermined duration and repeated concurrently, and wherein the method further comprises repeating said control light signal with an idle period the duration of which corresponds to a fraction of the duration of said light sensing mode.

11. A method according to claim 7 comprising toggling between said light emitting mode and said light sensing mode.

12. A lighting system comprising at least one luminaire according to claim 1, and a remote control device, which is arranged to generate and emit said remotely emitted control light signal.

13. A lighting system according to claim 12, wherein said remote control device comprises a control light signal generator, a transmitter unit, which is connected with the control light signal generator, and a user interface, which is connected with the control light signal generator.

* * * * *